Feb. 8, 1927.
C. MATLOCK
1,617,071
CARBON BLACK AND PROCESS AND APPARATUS FOR PRODUCING SAME
Filed June 2, 1921
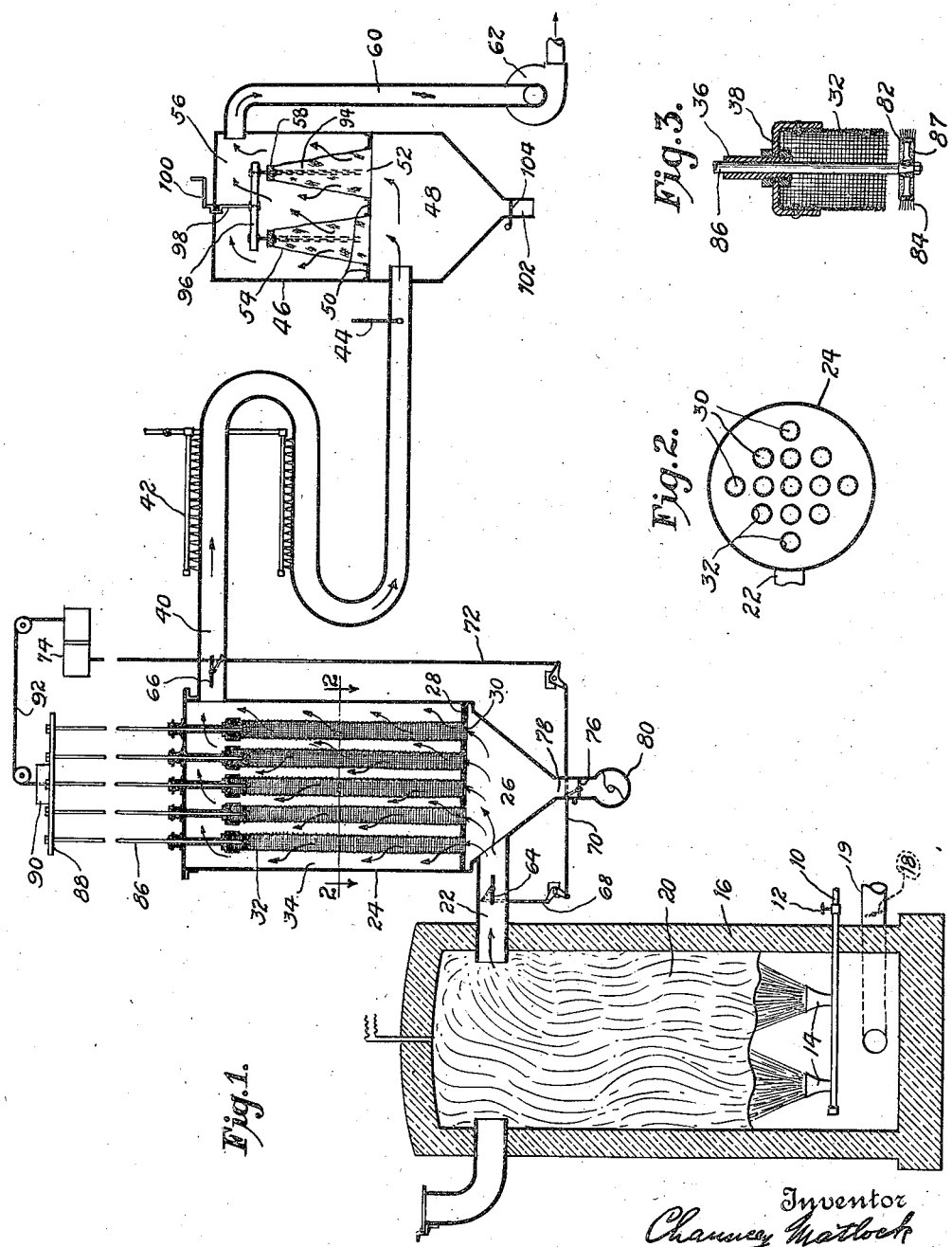

Patented Feb. 8, 1927.

1,617,071

UNITED STATES PATENT OFFICE.

CHAUNCEY MATLOCK, OF BROOKLYN, NEW YORK, ASSIGNOR TO MONROE-LOUISIANA CARBON COMPANY, OF MONROE, LOUISIANA, A CORPORATION OF DELAWARE.

CARBON BLACK AND PROCESS AND APPARATUS FOR PRODUCING SAME.

Application filed June 2, 1921. Serial No. 474,496.

The present invention relates to carbon black, and more particularly to an improved carbon black product and to a process and apparatus for the production of carbon black from hydrocarbons.

Carbon black has generally been produced heretofore for commercial purposes by the partial combustion of natural gas or hydrocarbons in such a manner as to obtain an imperfect admission and admixture of air with the hydrocarbons to the end that the complete and uniform combustion of the hydrocarbons should be avoided and a portion of the hydrocarbons merely dissociated or partly oxidized to form carbon and other products. Through this partial oxidation a small quantity of finely divided carbon was obtained in the products of the decomposition of partial combustion reaction. The suspended particles of carbon produced in this manner were thereupon separated from the gaseous products and collected either by introducing into or immediately above the flame a chill-plate or other device on which the carbon would adhere and form a deposit together with condensed or absorbed oils and tars. When a sufficient deposit had accumulated, the carbon was scraped from the plate together with iron scales or rust and the deposited oily or tarry products. If a carbon free of an excess of oil or tarry products was desired, the deposited carbon was usually freed from the tar and oil by reheating the carbon after being scraped from the plate or reheating the plate before the removal of the carbon by passing the plate over succeeding flames. This reheating of the carbon in a mass tended however to produce in the resulting product dense, gray cokelike forms of carbon which impaired the quality of the carbon black. In some cases carbon black has been collected without the use of a chill plate, but in these cases also the carbon has been contaminated with condensed or absorbed oily products.

The object of the present invention is to provide a carbon black substantially free of dense or cokelike forms of carbon and of oily or tarry substances.

Another object of the invention is to provide a process in which carbon of excellent quality may be efficiently and economically produced from hydrocarbons.

A further object of the invention is to provide a process in which carbon may be separated from gaseous products of combustion or dissociation of hydrocarbons without contamination with oily or tarry products present in the gases.

A still further object of the invention is to provide a process of producing carbon black in which several grades or qualities of carbon black may be produced and other products may be recovered.

A still further object of the invention is to provide an apparatus by which carbon may be produced from hydrocarbons and may be recovered in a substantially pure state and free from oily substances and undesirable forms of carbon.

With these and other objects in view, the invention comprises the product, the process, and the apparatus described in the following specification and defined in the claims.

The various features of the invention are illustrated in the accompanying drawings in which:

Fig. 1, is a view partly in elevation and partly in vertical section of a preferred form of apparatus suitable for producing carbon black by the present invention.

Fig. 2, is a horizontal section of a carbon filtering or separating means taken on line 2—2 of Fig. 1, and Fig. 3, is a sectional detail view of a portion of a filtering screen forming a part of a carbon separating element of the apparatus illustrated in Figs. 1 and 2.

In the present invention the partial combustion or decomposition of the hydrocarbons is accomplished in such a manner as to permit a control of the conditions governing the reaction, and the carbon thereby produced is separated from the gaseous or vaporous products formed, in such a manner as to avoid its contamination with oils or tars or other impurities present in the products of the reaction. To this end the hydrocarbons are preferably burned in an enclosed chamber with a regulated amount of air, the quantity of which is controlled in proportion to the hydrocarbons to obtain a desired partial combustion or decomposition of the hydrocarbons and definite temperature and combustion conditions within the furnace. When the desired combustion or dissociation of the hydrocarbons has been obtained the products of the reaction are immediately removed from the furnace and the carbon is separated from the gaseous products in which it is carried before sufficient cooling of the gases or carbon has taken place to permit a substantial amount of oily or tarry products to condense or be absorbed in the separated carbon.

In separating the carbon from the gaseous reaction products the combustion gases are therefore passed directly from the furnace through a separating screen which is protected from cooling or chilling action to prevent an excessive or uncontrolled cooling of the gases or carbon during the separating step. The separated carbon is maintained at a temperature above the end point or condensing temperature of the tarry and oily vapors until it is removed from contact with the gaseous products of combustion. The gases passing through the filtering screen may carry with them a small amount of carbon which is too fine to be retained on the screen, or which from other causes may be carried through the screens. The escaping gases also contain a considerable quantity of hydrocarbons, largely of the aromatic series, such for example as naphthaline, and of high boiling points. To obtain these residual products the residual gases are therefore chilled or cooled to condense the oils and tars and are thereafter filtered to collect the carbon and tars as a secondary or by-product.

Referring more particularly to the accompanying drawing, a regulated supply of gaseous hydrocarbons is supplied through a supply pipe 10 and a controlling valve 12 to burners 14 positioned in the lower part of a furnace or combustion chamber 16. A regulated supply of air sufficient to effect a partial combustion of the hydrocarbons is supplied to the furnace below the burners 14 through a supply pipe 19 and a control damper 18, to oxidize the hydrocarbons just sufficiently to obtain the desired temperature conditions and form a maximum of suspended carbon of the desired quality. As the air passes upwardly into contact with the streams of hydrocarbon gases from the burners 14, it is permitted to mix with the hydrocarbons and, upon the completion of the mixing, the gases are burned in the furnace at a short distance above the burners. A body or blanket 20 of hot or incandescent products of combustion is preferably maintained in the furnace extending upwardly from a short distance above the burners 14 and the completion of the mixing of the gases and air and partial combustion of the hydrocarbons takes place in this body or blanket of hot gases. By this manner of treatment the hydrocarbons are subjected in the body of gases to a substantially uniform temperature throughout; out of contact with cold surfaces or cold gases. To avoid an uncontrolled local cooling of the gases immediately adjacent the walls of the furnace and consequent interference with the combustion and dissociation reactions, the furnace is preferably constructed of a sufficient thickness of fire brick or other material to reduce the transfer of heat throughout to a minimum. As the gases reach the upper part of the furnace the desired combustion or dissociation will have been completed, and the carbon is thereupon separated from the gaseous products of reaction.

The separation of the carbon from the gases is accomplished without cooling either the carbon or the gases to a point at which oils or tars separate in substantial amounts. To this end the gases are withdrawn from the furnace through an outlet pipe 22 and enter a separating chamber 24 positioned adjacent to the upper part of the furnace. The gases are received in a lower compartment 26, formed in the chamber by a horizontal partition 28. From the compartment 26 the gases, together with the suspended carbon, pass upwardly through openings 30, Figs. 1 and 2, in the partition 28 and are received within tubular heat-resisting wire screens 32 of very fine mesh which are fastened at their lower ends to the edges of the openings 30 and are suspended at their upper ends in an upper compartment 34 formed by the partition 28. The screens are suspended from the top of the separator or screen chamber 24 by means of depending supports 36 to which caps 38, Fig. 3, forming the tops of the screens are attached. The gases are drawn into the interior of, and through the meshes of, the screens, which catch and retain the carbon particles.

The degree to which the gases may be permitted to cool is so controlled in relation to the furnace temperature that the temperature of the gases in the chamber 24 and accordingly of the separated carbon, do not fall below approximately 900 degrees F., or below the end boiling point of the oily or tarry products in the gases at their respective pressures. As the separated carbon is surrounded by the gases passing through the screens it does not come into contact with the surfaces exposed to atmospheric cooling and therefore does not form an absorbent medium for oily vapors contained in the gases.

Should the gases be cooled by contact with the walls of the compartment 34 to an extent sufficient to condense oily vapors, such cooling is prevented by insulating the walls of the chamber.

From the separator chamber 34 the residual gases, together with any particles of carbon which may have passed through the screens, are withdrawn through a pipe 40 and cooled to obtain the residual vapors and carbon. For this purpose the pipe 40 is provided with a suitable cooling means, such as the spray pipe 42, and with a thermometer 44 and the gases are cooled in the pipe 40 by controlling the quantity of spray from the pipe 42 in accordance with the indications of the thermometer 44, to obtain a sufficiently low temperature to condense the desired products and permit them to be separated from the gases by filters of canvas or other filtering fabric without injuring the latter.

The gases from the pipe 40 thereupon pass to a filtering chamber 46 and are received in a compartment 48, formed in the lower part of the chamber 46 by means of a horizontal partition 50. From the compartment 48 the gases pass upwardly through openings 52 in the partition 50 into filtering bags 54, which are fastened at their lower open ends to the peripheries of the openings 52 and are suspended upwardly in an upper compartment 56 formed by the partition 50 in the chamber 46. The bags 54 are closed at their upper ends by means of supporting plates 58 and the gases are therefore caused to pass through the fabric of the bags and the suspended condensed substances and carbon are filtered from the gases. From the compartment 56 the gases are exhausted to the atmosphere through an exhaust pipe 60 by means of a fan 62.

During the filtration of the carbon from the hot gases in the wire filter screen 24, a deposit or layer of carbon is formed on the inner side of the filtering tubes and gradually builds up to such an extent as to hinder or obstruct further passage of gases therethrough. When this point is reached the flow of the gases through the filter is interrupted and the carbon deposit removed, the gases being passed through another filter similarly arranged in parallel with the filter 24.

To this end dampers 64 and 66 are provided in the pipes 22 and 40 and are ordinarily held in horizontal, open, position during the filtration operation by means of rods 68, 70 and 72 connecting them to a timing device 74 which may be of any suitable type. At regular periods of time, adjusted to the rate at which the carbon deposit forms on the interior of the screens, the dampers 64 and 66 are closed by the timing mechanism 74 through the rods 72 and 68. At this time or immediately thereafter a damper 76, which during the filtering operation closes communication between a chute 78, to which the bottom of the damper 26 converges, is opened, to permit the disengaged carbon to fall therethrough into a removing or conveying trough or pipe 80.

Simultaneously with or shortly after the closing of the dampers 64 and 66, the carbon deposit is swept from the inner surface of the screens by means of circular brushes 82 or other removing means operated from the timing mechanism 74. The brushes 82 have short bristles 84 extending outwardly into contact with the inner surface of the screens 32 and upon being raised and lowered sweep the inner surface of the screens. The brushes are operated, and are normally supported within the upper cap portion 38 of the screens, by means of supporting rods 86, which extend upwardly within the supporting sleeves 36 of the caps 38 through the top of the filtering chamber 24.

The upper ends of the rods are suitably supported by a supporting frame 88 which may be weighted if necessary, by means of a weight 90 and may be raised and lowered by means of a cord 92 extending into the timing mechanism 74.

As the frame 88 is lowered the brushes 82 sweep over the inner surface of the screens and remove the carbon which thereupon falls through the lower open ends of the screens onto sloping bottoms of the lower chamber 26 and fall through the chute 78 into the conveyor or removing tube 80. When substantially all of the carbon has been removed the dampers 64 and 66 are opened, the damper 76 is closed and the brushes 84 are raised to their uppermost position.

The brushes 82 may be formed of solid disks on plates perforated to permit carbon to fall through and prevent clogging of the upper part of the filtering tubes, or may be in the form of an annular ring or wheel connected to the rod 86 by suitable spokes 87.

The screens 32 may be made of heat resisting or enduring wire or other materials capable of resisting destruction or deterioration at temperatures somewhat above 800 degrees C. A large variety of metals is available for forming these screens such as nichrome and some of the alloys of nickel or tungsten and other metals with steel. "Monel" metal is however, preferred in general for the formation of these screens. Screens of fine mesh are required to filter the finely divided carbon produced in the process. A screen of about 300 mesh however, will ordinarily be sufficiently fine to collect a major portion of the carbon. The filtration of the carbon will be more complete and thorough after a small deposit of carbon has formed, which thereupon serves as a filter. For this reason it is preferable to have the brushes 84 of such dimensions as to leave a flat thin deposit of carbon adhering to the inner surface of the screens. It is contemplated that other forms of filters and other separating apparatus may be employed but filters of the general type described above are preferred since the gases cannot be subjected to any cooling action until after they have moved out of contact with the filtered carbon and the carbon is completely surrounded by hot gases.

The temperature of the gases is cooled sufficiently in the pipe 40 that they may be filtered through fabric and the filters 54 may therefore be made of any suitable filtration cloth. The carbon and other products may be removed from the inner surface of the filters 54 by means of suspended chains 94, depending from supporting blocks 58 which are arranged to be given a rotary motion at intervals to throw the chains against the filters and to detach the deposit of carbon therefrom. For this purpose the blocks 58 are suspended from a frame work 96, which is supported from a rod 98, extending through the top of the filtering chamber 48 and may be given a slight rotary motion by means of a crank 100 on the outside of the filtering chamber. The carbon detached from the filters by the chains 94 drops through the openings 52 to the bottom of the chamber 46 which is sloped towards an exit chute 102. The chute 102 is normally closed by means of a damper 104 which is opened at intervals to permit filtered carbon and other substances to drop therethrough.

The carbon obtained through the hot filtration in the filtering chamber 24 is obtained substantially free from oily and tarry impurities, the oil and tar contained, being normally below .15 to .20 of one per cent and is suitable for use in making rubber and for other uses in which a substantially oil free carbon is desired.

A high efficiency and economy is obtained in the operation of the process through an excellent control of the temperature and other conditions within the furnace 16. Only a very small part of the carbon produced passes through the filters 24 and this carbon is moreover recovered in the filter 54 so that a very good recovery of the product is obtained.

A number of valuable by-products are obtained with the carbon collected on the filter 54, one of the principal constituents of these by-products being naphthalene. These products may be treated in any desired manner to separate the various constituents or may be carbonized to produce a denser and cheaper grade of carbon such as might be used as a base for the production of absorbent or activated charcoal.

It is also contemplated that a number of wire screens arranged in succession or in series may be used where necessary and that other carbon separating apparatus may be employed in place of the form of screen illustrated above.

Having described the invention what is claimed as new is:

1. A process of producing carbon black which comprises partially oxidizing hydrocarbons with a quantity of air sufficient to only partially oxidize said hydrocarbons and separating the carbon produced from the gaseous products of combustion at a temperature above 800 degrees F.

2. A process of producing carbon black which comprises partially oxidizing hydrocarbons with regulated quantities of air, maintaining said gaseous products of combustion at a temperature above 800 degrees F., and filtering the carbon produced from said gaseous products of combustion at a temperature above 800 degrees F.

3. A process of producing carbon black which comprises mixing hydrocarbons and air in definite controlled proportions insufficient to completely burn said hydrocarbons, igniting said mixture, maintaining the temperature of partial combustion above 800 degrees F., and filtering the carbon from the gaseous products of combustion while maintaining the temperature of said gases and carbon above 800 degrees F.

4. A process of producing carbon black which comprises burning hydrocarbons and air in definite proportions in a combustion zone, withdrawing the products of combustion from said zone and filtering said products of combustion before permitting a substantial cooling of said products of combustion.

5. A process of producing carbon black which comprises forming carbon from hydrocarbons at high temperatures and separating the carbon from the other products of said process at temperatures above 900 degrees F.

6. An apparatus for producing carbon black which comprises a furnace having air and hydrocarbon supply means, said furnace being insulated to prevent a substantial loss of heat and a filtering means adjacent the outlet of said furnace and adapted to separate carbon from gaseous products of combustion without permitting a substantial cooling action.

7. An apparatus for producing carbon black which comprises a furnace, burners in said furnace, means for controlling the supply of air to said furnace, means for controlling the supply of gases to said burners, means for removing the combustion products from said furnace and filtering means arranged to receive products of combustion directly from said furnace.

8. An apparatus for producing carbon black which comprises a combustion chamber, means for supplying combustibles and air in regulated proportions to said combustion chamber, said combustion chamber being substantially free of heat abstracting means for removing the combustion products from said furnace and a filter capable of enduring high temperatures arranged to receive gases directly from said combustion chamber.

9. An apparatus for producing carbon black which comprises a combustion chamber, burners in the lower part of said chamber, means for supplying combustibles to said burners and air to said combustion chamber in regulated proportions, the combustion chamber being arranged to avoid excessive abstraction of heat from said combustion gases, and a filter arranged to receive gases directly from the upper part of said combustion chamber.

10. An apparatus for producing carbon black which comprises a combustion chamber, means for supplying regulated quantities of air and combustibles to the lower part of said chamber, a filter arranged to receive gases from the upper part of said combustion chamber, said filter comprising a number of tubular wire screens of fine mesh and means for taking off carbon deposited on said screens while leaving a thin filtering deposit adjacent said screens.

11. An apparatus for producing carbon black which comprises a combustion chamber, a metallic screen of fine mesh positioned to receive gases from said furnace, means for cooling the exhaust gases from said filter and means for filtering said cooled gases.

12. An apparatus for producing carbon black in combination with the furnace, a number of filtering means connected to said furnace and to a carbon withdrawing means and means for closing said filter to said furnace and exit pipe and opening said filter to said carbon withdrawing means.

13. An apparatus for separating carbon from hot gases which comprises a filtering chamber, a partition in said chamber, openings in said partition, cylindrical tubular filtering screens having open ends fitted in said openings and supported above said partition, and brushes lightly fitting the walls of said screens and means for passing said brushes over said screens.

14. An apparatus for separating carbon from hot gases which comprises a filtering chamber, a partition in said chamber, openings in said partition, cylindrical tubular filtering screens having open ends fitted in said openings and supported above said partitions, and means for removing the last deposited portions of the carbon deposit on the surface of said screens while leaving the portion next the screen as a filtering layer.

15. In an apparatus for producing carbon black, the combination of a furnace having an outlet; a heat resisting screen connected to said outlet arranged to filter suspended carbon from the gases from said furnace; and means for removing the portions of carbon deposited last, while leaving the underlying portions adjacent the screens as a filtering layer.

16. In an apparatus for producing carbon black, the combination of a furnace, screens arranged to receive gases from said furnace, means for closing communication between screens and said furnace, means for removing carbon from said screens and a common control means for said carbon removing means and said means for shutting communication between said screen and said furnace.

17. In an apparatus for producing carbon black, the combination of a furnace, screens arranged to separate carbon particles from said gases, brushes arranged to sweep said carbon from said screens at intervals, and means for closing communication between said furnace and said screens during said brushing operation.

18. An apparatus separating carbon from gases at high temperatures which comprises a chamber, a partition in said chamber, openings in said partition, and tubular screens of heat resisting wire having an open end mounted in said openings.

19. An apparatus for separating carbon from hot gases which comprises a filtering chamber, a partition in said chamber, openings in said partition, cylindrical tubular screens having open ends fitted in said openings and supported above said partitions, and brushes positioned within said tubular screens, the outer operative surfaces of said brushes terminating at a point adjacent to but removed from the surface of the screens.

20. A process of producing carbon black which comprises partially oxidizing hydrocarbons to produce finely divided carbon and separating said carbon from the gaseous products of combustion at a temperature above that at which a substantial amount of tars and oils may be separated with said carbon from said gaseous products of combustion, and continuously depositing a portion only of said separated carbon.

In testimony whereof, I affix my signature.

CHAUNCEY MATLOCK.

CERTIFICATE OF CORRECTION.

Patent No. 1,617,071.  Granted February 8, 1927, to

CHAUNCEY MATLOCK.

It is hereby certified that error appears in the printed specification of the above numbered patent requiring correction as follows: Page 3, line 92, for the word "solid" read "molded"; page 4, line 120, claim 8, after the word "abstracting" insert the word "means"; and that the said Letters Patent should be read with these corrections therein that the same may conform to the record of the case in the Patent Office.

Signed and sealed this 17th day of May, A. D. 1927.

Seal.

M. J. Moore,
Acting Commissioner of Patents.